United States Patent
Sutton et al.

(10) Patent No.: US 7,434,297 B1
(45) Date of Patent: Oct. 14, 2008

(54) TRACKING COMPUTER INFECTIONS

(75) Inventors: Richard Sutton, Los Angeles, CA (US);
John Millard, Pasadena, CA (US)

(73) Assignee: Symantec Corporation, Cupertino, CA (US)

( * ) Notice: Subject to any disclaimer, the term of this patent is extended or adjusted under 35 U.S.C. 154(b) by 844 days.

(21) Appl. No.: 10/715,346

(22) Filed: Nov. 17, 2003

(51) Int. Cl.
*G06F 21/00* (2006.01)

(52) U.S. Cl. .......................................... 26/24; 713/188

(58) Field of Classification Search ................... 726/24; 713/188, 160
See application file for complete search history.

(56) References Cited

U.S. PATENT DOCUMENTS

| | | | | |
|---|---|---|---|---|
| 6,108,799 | A | * | 8/2000 | Boulay et al. .................. 714/38 |
| 2004/0003284 | A1 | * | 1/2004 | Campbell et al. ............ 713/201 |
| 2005/0027854 | A1 | * | 2/2005 | Boulanger et al. ........... 709/224 |
| 2005/0033975 | A1 | * | 2/2005 | Lahti et al. ................... 713/200 |

* cited by examiner

*Primary Examiner*—Gilberto Barron, Jr.
*Assistant Examiner*—Samson B Lemma
(74) *Attorney, Agent, or Firm*—Van Pelt, Yi & James LLP

(57) ABSTRACT

A technique is disclosed for tracking a virus. The technique comprises copying information from a first packet; passing through a second packet; saving the copied information; determining whether an infection has been received, wherein the infection is associated with a network transmission, and wherein the network transmission is also associated with the first packet; and retrieving the saved information.

22 Claims, 4 Drawing Sheets

TRACKING COMPUTER INFECTIONS

FIELD OF THE INVENTION

The present invention relates generally to computer systems. More specifically, a technique for tracking computer infections is disclosed.

BACKGROUND OF THE INVENTION

Computer viruses are a significant threat to network environments. System administrators of networks often find it challenging to rapidly respond to such a threat to the network. For example, although a single infected computer may be purged of the virus, a system administrator may find that the computer virus may infect various computers in the network for an extended period of time so long as there remains at least one infected computer in the network. In the meantime, the system administrator is often required to try to track down the virus to determine which computer in the network is repeatedly infecting and clogging up the network. This process is typically time consuming and expensive.

What is needed is a technique for tracking computer infections.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

Figure 1:
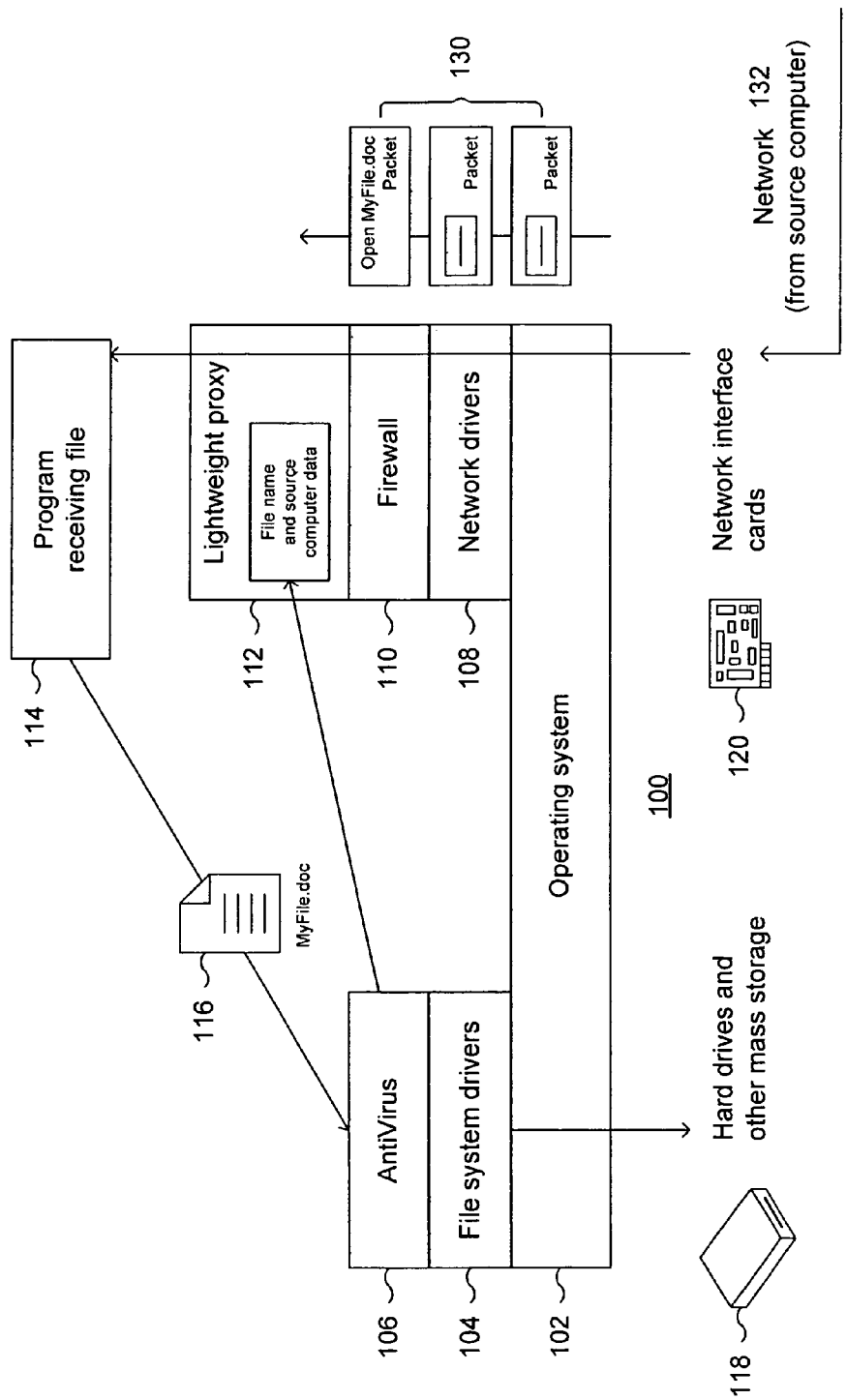
FIG. 1 is a bock diagram of a technique for tracking a computer infection according to an embodiment of the present invention.

FIG. 1 is a block diagram of a technique for tracking a computer infection according to an embodiment of the present invention. A computer infection, as used herein, includes viruses, worms, and any combination or variant thereof, and any unwanted program that installs on the computer without the user's knowledge or permission. In this example, a computer 100 is shown to include an operating system 102, file system drivers 104, and anti-virus program 106, network drivers 108, a firewall 110, a light weight proxy 112, a program that can receive a file 114, hard drives and other mass storage 118, and network interface cards 120. If network packets 130 containing a file arrive from another computer via network 132, the proxy 112 observes a subset of network packets 130, such as an open packet, and saves the information associated with the open packet. One example of information that can be saved include the file name that is being received. Another example includes information regarding the computer that sent the file (source computer) such as the network address of the source computer.

An open packet is generally included in most protocols that encapsulate file transfers. An open packet can include an "open file" or "create file" request. Although the subset of network packets 130 is often referred to herein as an open packet for ease of reference, the subset of network packets 130 can be a single packet or a plurality of packets, and an open packet can refer to a single packet or several packets that include instructions such as "open file", "create file", "read file", "write file", "delete file" or any request to modify or access a file. This open packet is generally the first packet or packets in a stream of network packets and it includes information such as a destination file name. Open packets vary depending on the protocol. Further details of how an open packet is used according to some embodiments is later discussed in conjunction with FIGS. 3 and 4.

The network packets 130 may be received by a receiving program 114. The file is reconstructed from the received packets 130 and written to disk. The reconstructed file is shown as document 116 in this example. The anti-virus 106 checks the received file 116 for virus. If a virus is found, then it can be determined which source computer sent the virus since the network address of the source computer that sent the virus has been saved.

Figure 2:
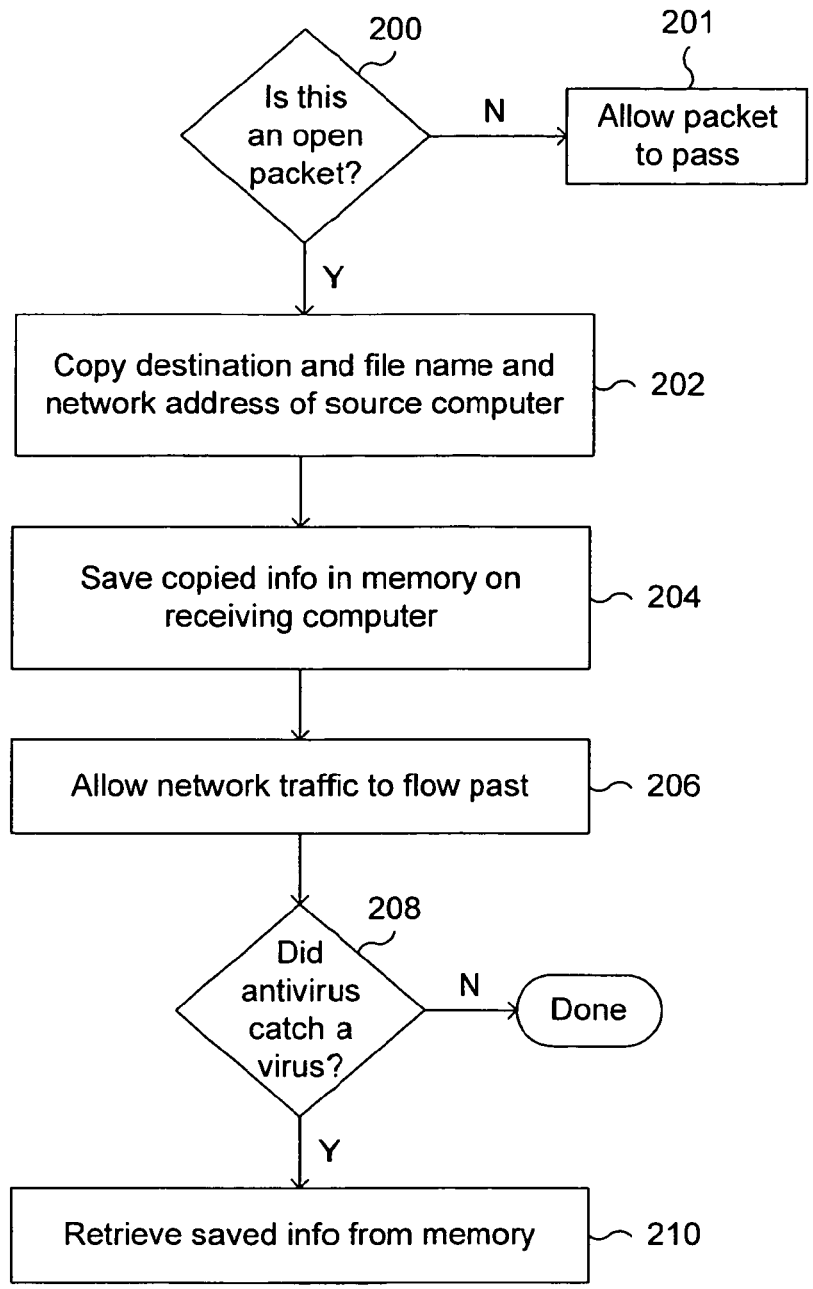
FIG. 2 is a flow diagram of a technique according to an embodiment of the present invention for tracking a computer infection.

FIG. 2 is a flow diagram of a method according to an embodiment of the present invention for tracking a source computer of an infection in a network. In this example, as network packets are being received by the computer, it is determined whether this particular packet is an open packet (200). If it is not an open packet, the packet is allowed to pass (201). If, however, this packet is an open packet then information about the communication is copied (202). Examples of such information include destination, file name, network address of the source computer, username, user credentials, name of source computer such as a netbios name or a domain name service (DNS) name. Accordingly, a subset of the network transmission can be analyzed rather than the entire set of packets in the network transmission. The copied information is then saved (204). For example, the copied information can be saved in the memory of the receiving computer. Network traffic is allowed to flow past until the next open packet (206). If an anti-virus program catches a virus from the file associated with this particular open packet (208), then the saved information associated with the open packet is retrieved (210). An example of when the determination of whether a virus has been received can be performed when an attempt to access a file occurs, such as open, read, write, create, or delete a file request occurs. Once the saved information is retrieved, the infected source computer can be tracked down and dealt with appropriately.

In one embodiment, once it is determined which computer the infected file came from, the information can be communicated with a firewall process residing on the same computer to block traffic from the infected source computer. In one embodiment, the protocol stream in subsequent transmissions from the infected computer can be modified by dropping packets that specify the "open" command. Because worms are rarely designed with much fault tolerance, this will likely cause the worm to hang and thus prevent it from infecting other computers. In one embodiment, a management process running on a remote computer can be notified in order to allow an administrator or the management process to take manual or automated action aimed at the infected computer.

In one embodiment, the technique presented herein is implemented on file servers. In another embodiment, it is part of a firewall. In another embodiment, it is part of an anti-virus software. In another embodiment, it is part of a combined firewall/anti-virus software. In yet another embodiment, it is independent of the firewall and anti-virus software. In one embodiment it occurs in the receiving computer or server.

Figure 3:
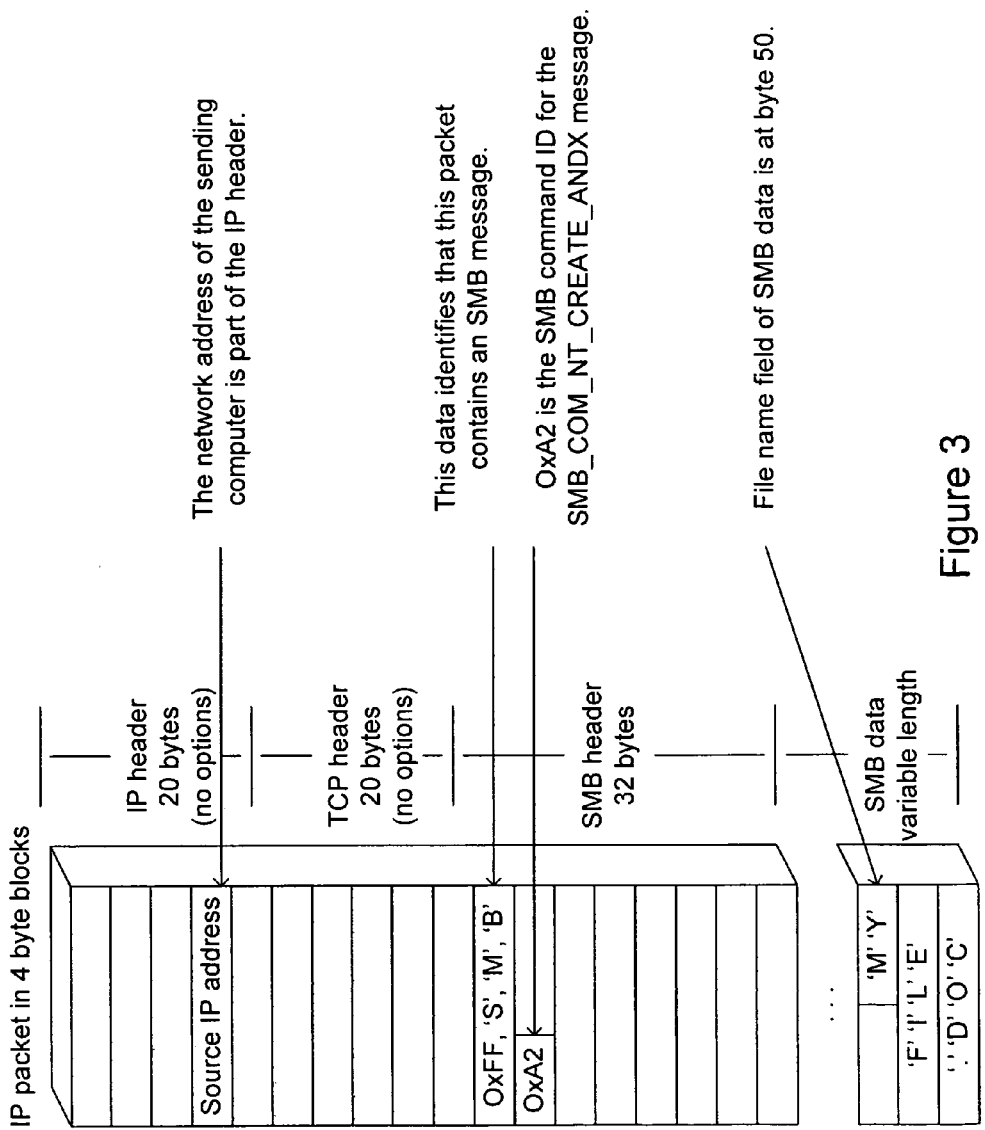
FIG. 3 shows an example of an SMB open packet which can be used with some embodiments.

FIG. 3 shows an example of a server message block (SMB) open packet which can be used with some embodiments. Such an open packet may be part of a network packet stream that is received by a computer. As previously mentioned, an open packet may be a single packet or several packets. In this example, the SMB open packet is shown to include approximately twenty bytes for an IP header which includes the network address of the sending computer. It is also shown to include a TCP header of approximately twenty bytes, an SMB header of approximately twenty bytes, and an SMB data of variable length.

The following sequence is an example of a message flow from an SMB client to and SMB server when the client wants to write a file to a file share on the server:
SMB_COM_NEGOTIATE
Negotiate SMB dialect and message capabilities.
SMB_COM_SESSION_SETUP_ANDX
Specifies user name and password.
SMB_COM_TREE_CONNECT_ANDX
Specifies the root directory share that the client wants to access.
SMB_COM_NT_CREATE_ANDX
Specifies the file name and creation semantics.
SMB_COM_WRITE
Writes raw data to the file specified in the previous message.
SMB_COM_CLOSE
Closes the file.
SMB_COM_TREE_DISCONNECT
Ends the session.

In one embodiment, the destination file name is found in the SYB_COM_NT_CREATE_ANDX message. This destination file name can be copied and stored for later use in case of an infection, as described in the example shown in FIG. 2.

Figure 4:
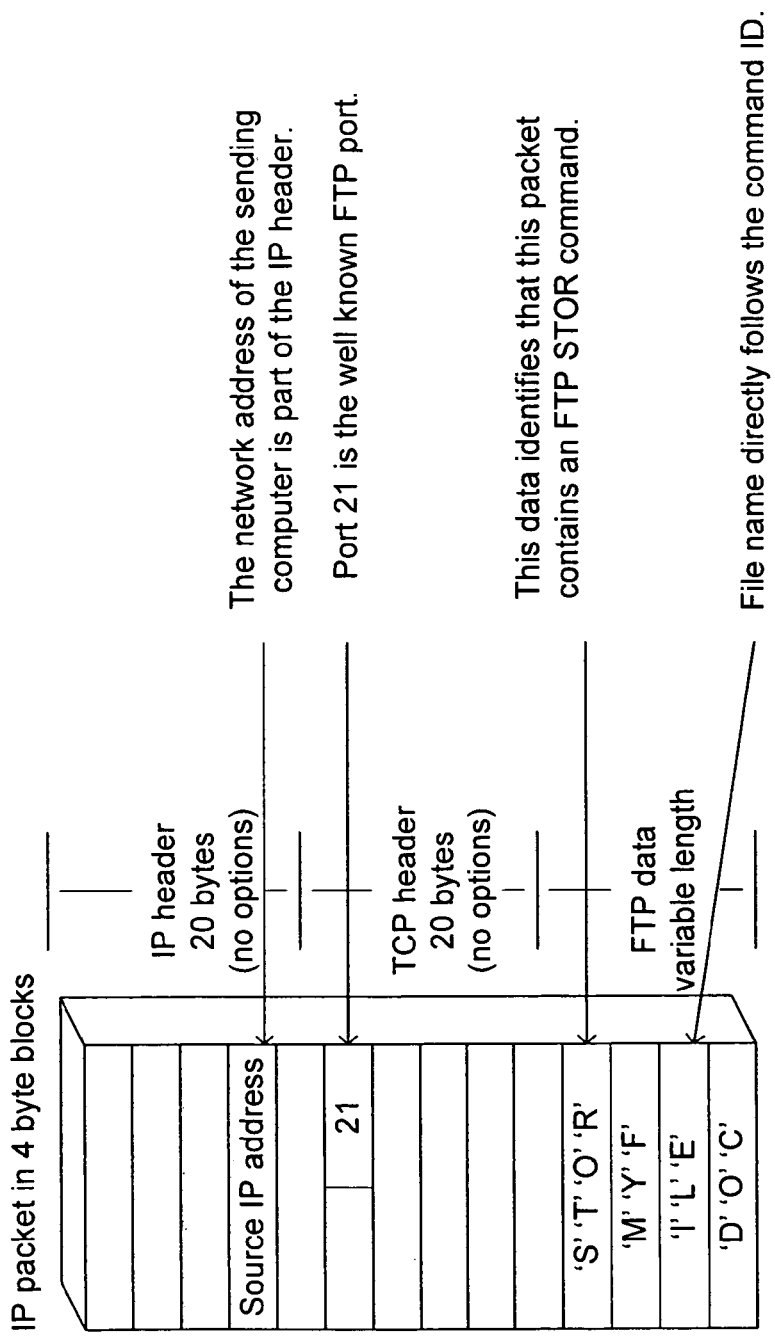
FIG. 4 shows an example of an FTP open packet which can be used with some embodiments.

FIG. 4 shows an example of an FTP open packet which can be used with some embodiments. Such an open packet may be part of a network packet stream that is received by a computer. As previously mentioned, an open packet may be a single packet or several packets. In this example, the FTP open packet is shown to include an IP header of approximately twenty bytes, which includes the network address of the sending computer. Additionally, a TCP header is also shown to be included with approximately twenty bytes as well as the FTP data which is shown to be of variable length. In one embodiment, the destination file name is found in the FTP data. Such information can be copied and stored for later use in case of an infection, as described in the example shown in FIG. 2.

The following sequence gives an example of a message flow from an FTP client to an FTP server when the client wants to write a file to a directory on the server:
USER
Specifies user name for session logon.
PASS
Specifies password for session logon.
PORT
Specifies the TCP port to use when transferring data to and from the client.
STOR
Specifies the name of the file to create on the server.

The destination file name can be found in the STOR message which can be copied and stored for later use in case of an infection, as described in the example shown in FIG. 2.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for tracking a virus comprising:
copying from a first packet received at a destination host to which the first packet is addressed an information including a sender information usable to determine a sending source that addressed and sent the first packet to the destination host, wherein the information is copied from the first packet based at least in part on a determination that the first packet comprises an open packet;
passing through a second packet associated with the first packet, without copying from the second packet said information including a sender information, based at least in part on a determination that the second packet does not comprise an open packet;
saving the information copied from the first packet;
determining whether an infection has been received, wherein the infection is associated with a network transmission with which the first and second packets are associated;
retrieving the saved information; and
using the saved information to identify and take a responsive action with respect to the sending source.

2. The method of claim 1, wherein the information includes a file system location.

3. The method of claim 1, wherein the information includes a file name.

4. The method of claim 1, wherein the information includes a network address of a source computer.

5. The method of claim 1, wherein the information is saved on the destination host.

6. The method of claim 1, wherein the determination of when a virus has been received is performed when an attempt to write a file occurs.

7. The method of claim 1, wherein the determination of when a virus has been received is performed when an attempt to open a file occurs.

8. The method of claim 1, wherein the determination of when a virus has been received is performed when an attempt to read a file occurs.

9. The method of claim 1, wherein the determination of when a virus has been received is performed when an attempt to create a file occurs.

10. The method of claim 1, wherein the determination of when a virus has been received is performed when an attempt to delete a file occurs.

11. The method of claim 1, wherein the determination of when a virus has been received is performed when an attempt to access a file occurs.

12. The method of claim 1, wherein the network transmission includes a plurality of network packets.

13. The method of claim 1, further comprising copying information from a third packet and saving the copied information.

14. The method of claim 1, further comprising copying and saving information from a plurality of packets, wherein the plurality of packets are a subset of a network transmission.

15. The method of claim 14, further comprising passing through a second plurality of packets, wherein the second plurality of packets are a second subset of the network transmission.

16. The method of claim 1, wherein information includes a username.

17. The method of claim 1, wherein information includes a user credential.

18. The method of claim 1, wherein information includes a name of a source computer.

19. The method of claim 1, wherein information includes a netbios name.

20. The method of claim 1, wherein information includes a domain name service name.

21. A system for tracking a virus comprising:
a processor configured to copy from a first packet received at a destination host to which the first packet is addressed an information including a sender information usable to determine a sending source that addressed and sent the first packet to the destination host, wherein the information is copied from the first packet based at least in part on a determination that the first packet comprises an open packet; pass through a second packet associated with the first packet, without copying from the second packet said information including a sender information, based at least in part on a determination that the second packet does not comprise an open packet; save the information copied from the first packet; determine whether an infection has been received, wherein the infection is associated with a network transmission with which the first and second packets are associated retrieve the saved information; and use the saved information to identify and take a responsive action with respect to the sending source; and
a memory coupled with the processor, wherein the memory is configured to provide the processor with instructions.

22. A computer program product for tracking a virus, the computer program product being embodied in a computer readable medium and comprising computer instructions for:
copying from a first packet received at a destination host to which the first packet is addressed an information including a sender information usable to determine a sending source that addressed and sent the first packet to the destination host, wherein the information is copied from the first packet based at least in part on a determination that the first packet comprises an open packet;
passing through a second packet associated with the first packet, without copying from the second packet said information including a sender information, based at least in part on a determination that the second packet does not comprise an open packet;
saving the information copied from the first packet;
determining whether an infection has been received, wherein the infection is associated with a network transmission with which the first and second packets are associated retrieving the saved information; and
using the saved information to identify and take a responsive action with respect to the sending source.

* * * * *